(No Model.)
C. CHAMBERLIN.
HORSESHOE.
No. 265,580. Patented Oct. 10, 1882.
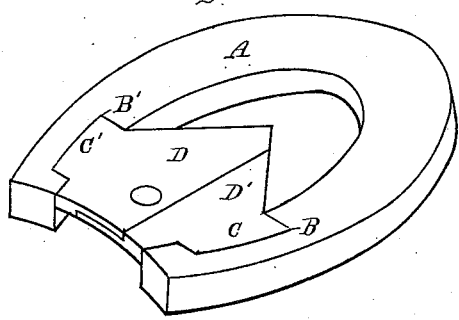
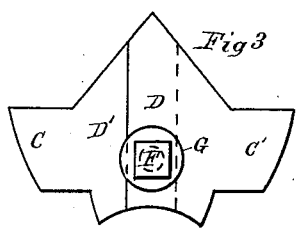
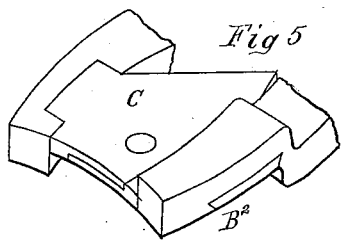
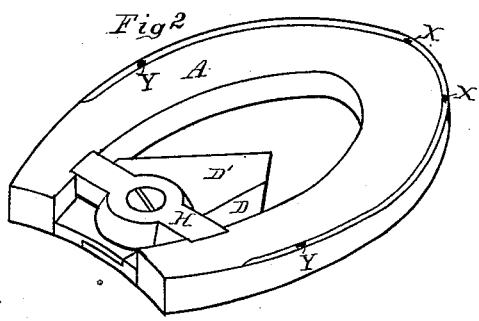
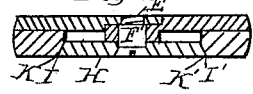
Witnesses—
Kirtley Hyde,
W. L. Davis
Inventor—
Charles Chamberlin,
By Albert M. Moore,
His Attorney.

UNITED STATES PATENT OFFICE.

CHARLES CHAMBERLIN, OF LOWELL, MASSACHUSETTS.

HORSESHOE.

SPECIFICATION forming part of Letters Patent No. 265,580, dated October 10, 1882.

Application filed May 7, 1881. (No model.)

*To all whom it may concern:*

Be it known that I, CHARLES CHAMBERLIN, of Lowell, in the county of Middlesex and Commonwealth of Massachusetts, have invented certain new and useful Improvements in Horseshoes, of which the following is a specification.

The principal features of my invention are a frog-support provided with arms which enter recesses made in the shoe, dividing such support, as herein described, into rabbeted overlapping halves, and firmly securing these halves to each other when in use.

In the accompanying drawings, Figures 1 and 2 are oblique views showing the top and bottom, respectively, of a horseshoe to which my invention is applied. Fig. 3 is a plan of the frog-support detached and inverted. Fig. 4 is a vertical cross-section (through the screw) of a horseshoe to which the frog-support and bar are applied. Fig. 5 shows how one arm of the frog-support may be placed under the shoe.

A is a horseshoe, which may be of the usual construction, provided on the top with recesses B B' to receive the arms C C' of the frog-support D D'. The frog-support is shaped generally to conform to the bottom of the frog of a horse's foot, and is made in halves D D', these halves overlapping each other, and each half rabbeted at its inner edge—one half, D, rabbeted on the top and the other half, D', on the bottom—to an equal amount, so that each half admits the other, and their corresponding faces lie in the same plane. A hole, E, is drilled and tapped through the rabbeted portions of each half, and a screw, F, passed up through said halves, holds them together and makes them unyielding when in use. That this screw F may be more readily turned, its head may be square or many-sided, and should be thin, so as not to reach below the shoe. To hold the halves D D' more firmly together, and especially to prevent any upward bend of the support, I use a washer, G, large enough to reach beyond the edges of said halves. The frog-support above described is made of cast metal, rather than of sheet metal, and of sufficient strength and inflexibility so as not readily to be bent upward against the foot when the horse steps on a stone. A means of securing the frog-support in place and of preventing its bending upward is shown in Figs. 2 and 4.

The bar H, being of considerable thickness and having its ends beveled, as shown at I I', is placed in inclined recesses K, cut or filed on the inside of the shoe, just below the frog-support, so that the screw F' draws the support and the bar toward each other and holds both firmly in place. This device I use where a horse has navicular disease, with inflammation or ulceration, to secure the frog from injury or pressure.

Where a horse has a corn and it is desirable, or, at least, not objectionable, to have pressure on the frog, I dispense with the bar and use the support, as shown in Fig. 3, which lies upon the shoe and may be pressed up against the frog; also, in case of a corn, I sometimes let the piece into the top of the shoe on the well side of the foot and offset the shoe upward on the side where the corn is, and place one arm of the support under the shoe in the offset $B^2$ to prevent pressure immediately on the part affected by the corn.

It will be seen that by removing the screw the halves of the support can be slipped by each other and removed from the shoe. The great advantage of this is in cases of thrush, (a humor which finds an outlet in the frog and sometimes renders the frog incapable of bearing any pressure if covered,) where it is necessary frequently to remove the support in order that the frog may be cleansed to preserve its natural elasticity and tenacity; also, by removing the support a piece of leather or similar substance may be placed between the frog and the support to get an increased pressure on the frog by means of the screws F F', when desired, in contraction of the foot or quarter-crack, where it is necessary to expand the hoof, expansion of the hoof being gradually and safely accomplished by pressure upon the frog.

The invention above described is just as applicable to a smooth or summer shoe as to a shoe with calks.

By applying the support to the frog it entirely obviates the evils of the common method of shoeing, and supports the foot in a natural way, just as it would be supported on the ground without shoes, which may be regarded as a necessary evil. The support does not cover the whole of the foot, but only the frog, and leaves the rest of the foot exposed, as it should be.

To get the full benefit of my invention, I omit the quarter-nails Y Y, or the nails nearest the heel in common use, and instead drive two nails, X X, in the toe, where there are usually no nails, the crease or countersink of the shoe being carried around the toe, as shown. This leaves the quarters free to expand and holds the shoe on with sufficient firmness, while the foot is just as free to expand as though the frog rested upon the ground without any shoes.

I claim as my invention—

1. The combination of the shoe A, provided with recesses B B', a frog-support, D D', formed in rabbeted overlapping halves, and a screw, F, as and for the purpose specified.

2. The combination of the shoe A, provided with recesses B B', the frog-support D D', provided with arms C C', the bar H, and the screw F', as and for the purpose specified.

CHARLES CHAMBERLIN.

Witnesses:
ALBERT M. MOORE,
S. G. LYFORD.